Figure 1:
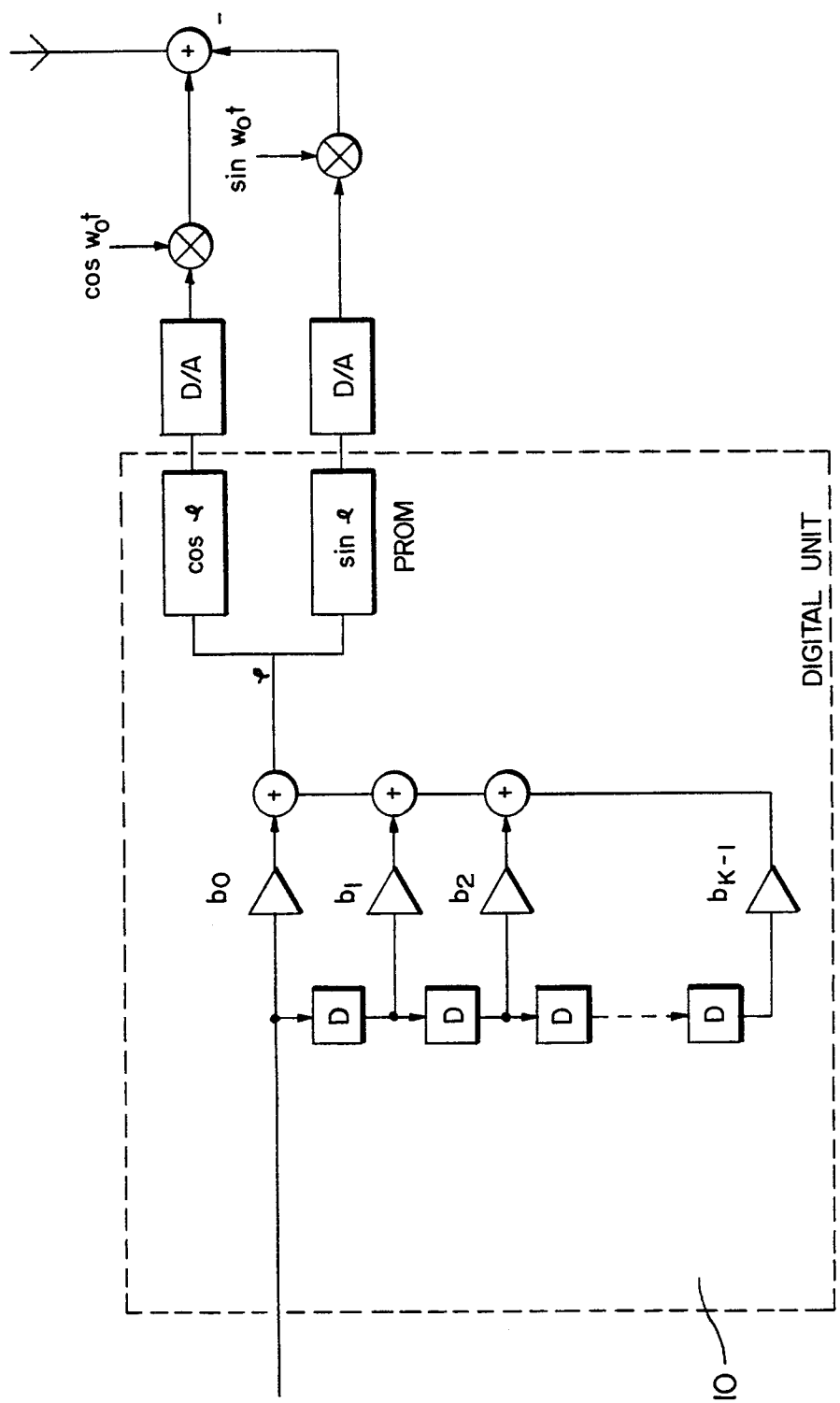

United States Patent [19]

Maseng et al.

[11] Patent Number: 5,029,186

[45] Date of Patent: Jul. 2, 1991

[54] METHOD OF DEMODULATION IN DIGITAL COMMUNICATION SYSTEMS WITH MULTIPATH PROPAGATION

[75] Inventors: Torleiv Maseng; Odd Trandem, both of Trondheim, Norway

[73] Assignee: Stiftelsen For Industriell Og Teknisk Forskning Ved Norges Tekniske Hogskole (SINTE), Trondheim, Norway

[21] Appl. No.: 299,937

[22] PCT Filed: May 11, 1988

[86] PCT No.: PCT/NO88/00040

§ 371 Date: Jan. 13, 1989

§ 102(e) Date: Jan. 13, 1989

[87] PCT Pub. No.: WO88/09591

PCT Pub. Date: Dec. 1, 1988

[30] Foreign Application Priority Data

May 19, 1987 [NO] Norway ................................. 872093

[51] Int. Cl.$^5$ ............................................ H04L 27/38
[52] U.S. Cl. ........................................ 375/94; 371/43; 375/39; 375/101
[58] Field of Search ................... 375/99, 101, 102, 39, 375/25, 27, 94, 96; 371/43; 329/311

[56] References Cited

U.S. PATENT DOCUMENTS

| | | | |
|---|---|---|---|
| 4,503,545 | 3/1985 | Bremer et al. | 375/39 |
| 4,536,878 | 8/1985 | Rattlingourd et al. | 371/43 |
| 4,555,790 | 11/1985 | Betts et al. | 375/39 |
| 4,631,735 | 12/1986 | Qureshi | 375/39 |

*Primary Examiner*—Benedict V. Safourek

*Attorney, Agent, or Firm*—Fleit, Jacobson, Cohn, Price, Holman & Stern

[57] ABSTRACT

A method of demodulation in digital communication systems with multipath propagation, based on the use of algorithms of the Viterbi, Fano, Stack and similar types, with soft decision type decoding, where there is included calculation of reference values in the receiver, and the receiver in its selection of received sequence takes as a basis a calculation of metrics using the difference between possible transmitted sequences and the signal received, and where the receiver only processes sequences having each a limited number of consecutive data symbols which in the following are denoted "known" and the instantaneous value of the received signal is influenced by a number of data symbols being larger than the number of "known" symbols, other data symbols being in the following denoted "unknown" data symbols, and the receiver employs an estimate of the impulse response (h(t)) of the multipath propagation channel, is characterized in that the calculation of the reference values for a certain sequence of "known" data symbols includes obtaining a transmitted signal for a sequence of data symbols having a length equal to the sum of the "known" and one or more "unknown" data symbols, forming an average of the transmitted signal over all possible values of the "unknown" date symbols convolving said averaged signal with the estimates of the impulse response of the channel to calculate the reference values for the instantaneous value of the received signal, calculating a metric taking the difference between the received signal and at least a limited number of possible sequences consisting of "known" data symbols and using said reference values and estimating the actually transmitted sequence of data symbols using said metric.

15 Claims, 3 Drawing Sheets

METHOD OF DEMODULATION IN DIGITAL COMMUNICATION SYSTEMS WITH MULTIPATH PROPAGATION

This invention relates to digital communication systems in which multipath propogation occurs, and in which Viterbi or other algorithms for calculating reference values are employed, such as algorithms of the Fano or Stack types. These reference values are used for calculating metrics in such algorithms, e.g. the Viterbi algorithm or the like.

Examples of fields of use of the invention are underwater communication, troposcatter communication, shortwave radio, mobile communication and communication via transmission lines. The invention can also be used in communication systems in which multipath propogation is caused by filters in the transmitter or the receiver, in addition to that being caused by the channel between transmitter and receiver. The method can be used in combination with digital phase modulation (DPM), digital frequency modulation (DFM), "tamed frequency modulation" (TFM), Gaussian "minimum shift keying" (GMSK) and other modulation methods, in which the transmitter employs pulses having lengths larger than one symbol interval (Partial response signalling), in particular those having a compact power spectrum.

Receivers for digital transmission through channels with multipath propagation are known (see list of references at the end of this specification). These are based on the use of DFE-equalizers {1} and Viterbi decoders {2, 9} and methods only scanning a limited number of possible data sequences {3}. It is also known to calculate reference values by only utilizing a portion of the multipath response {5} as well as methods for calculating the performance of this approximation {4}. Moreover there is known {6} a method for reducing the number of filters (Averaged Matched Filter) being required in a receiver for single path propagation as an alternative to Viterbi decoding. As a general background, reference can be made to chapter 6 in the book "Error-Correction Coding for Digital Communications" {8}.

In digital communications it is expected in many situations that such large differences will occur between the individual multipath delays, that a practical receiver will not be able to handle these situations. Therefore it is important to make the best possible use of the limited number ($\nu$) consecutive data symbols which can be treated in the receiver. In other words a practical receiver, which cannot have an unreasonably high complexity, can only take into account a limited number of data symbols. In this connection these are denoted "known" data symbols.

The number of possible sequences increases exponentially ($M^\nu$) when the number of known data symbols having M possible values, increases. With multipath transmission the difference in delay between the multiple paths to be handled by a receiver will be proportional to the number of data symbols considered to be known, i.e. to $\nu$. The number of possible sequences therefore will increase exponentially with the difference in delay between the multiple paths, and it is therefore very important to be able to handle as large multipath delay differences as possible without increasing the number of data symbols considered to be known.

A receiver employing previously known methods will not be able to handle larger differences between the individual multipath delays in the number of data symbols, than the difference between the number of data symbols considered to be known in the receiver, and the number which influences the (known) transmitted symbol when the part of the multipaths profile which is longer than this difference, includes a significant portion of the total power of the profile. This is a situation often occurring in practice.

The primary object of the invention is to provide an improved demodulation in digital communication systems without making the receiver so complex that it cannot be implemented in practice. This is obtained by means of a method as defined more closely in the claims.

In short the solution presented here is based on the fact that knowledge of the signal in which more than $\nu$ data symbols are included, is not lost instantaneously, but gradually as an increasing number of "unknown" data symbols influence the signal, by calculating at a certain instant the average value which the signal would have (whereby the averaging is made over the unknown data symbols), and this average value is used as reference value. This method takes into account multipath propagation channels having responses with a duration longer than the number of known data symbols in the receiver should indicate.

The transmitter contains among other things a coder, a modulator and filters. The arrangement of these determines in an unambiguous way the relationship between data and the signal transmitted. This relationship is known by the receiver. It is the utilization of this relationship which forms the basis of the invention. This relationship can be due to several transmitter components, and which components actually determine this relationship is not essential for the practical value of the invention. The invention constitutes a general technical method and thus is not connected to any definite modulation or coding method.

Calculation of reference values by means of this method can be done by calculating all signal values required for performing these calculations, and to store these in the receiver in such a manner that reference values can be calculated in a simple way from these by convolution with the estimated multipath impulse response of the channel.

The advantage of calculating and organising all values (signals) beforehand, is a reduction in the number of calculating operations to be performed in order to calculate reference values when the multipath response of the channel is known.

Examples of results obtained by means of the invention are given in {2} for DPM. An assumption here is binary data symbols (M=2) and $\nu=5$, i.e. $2^{5-1}=16$ states in a Viterbi algorithm illustrated. Even if pulses of length L=2, 3 and 4 data symbols are transmitted, channels having multipath profiles with length more than 3, 2 and 0 symbols respectively, can be handled. An example given below relates to DPM signals, but for example by introducing differential coding it can be adapted for GMSK, TFM and DFM signals.

Figure 2:
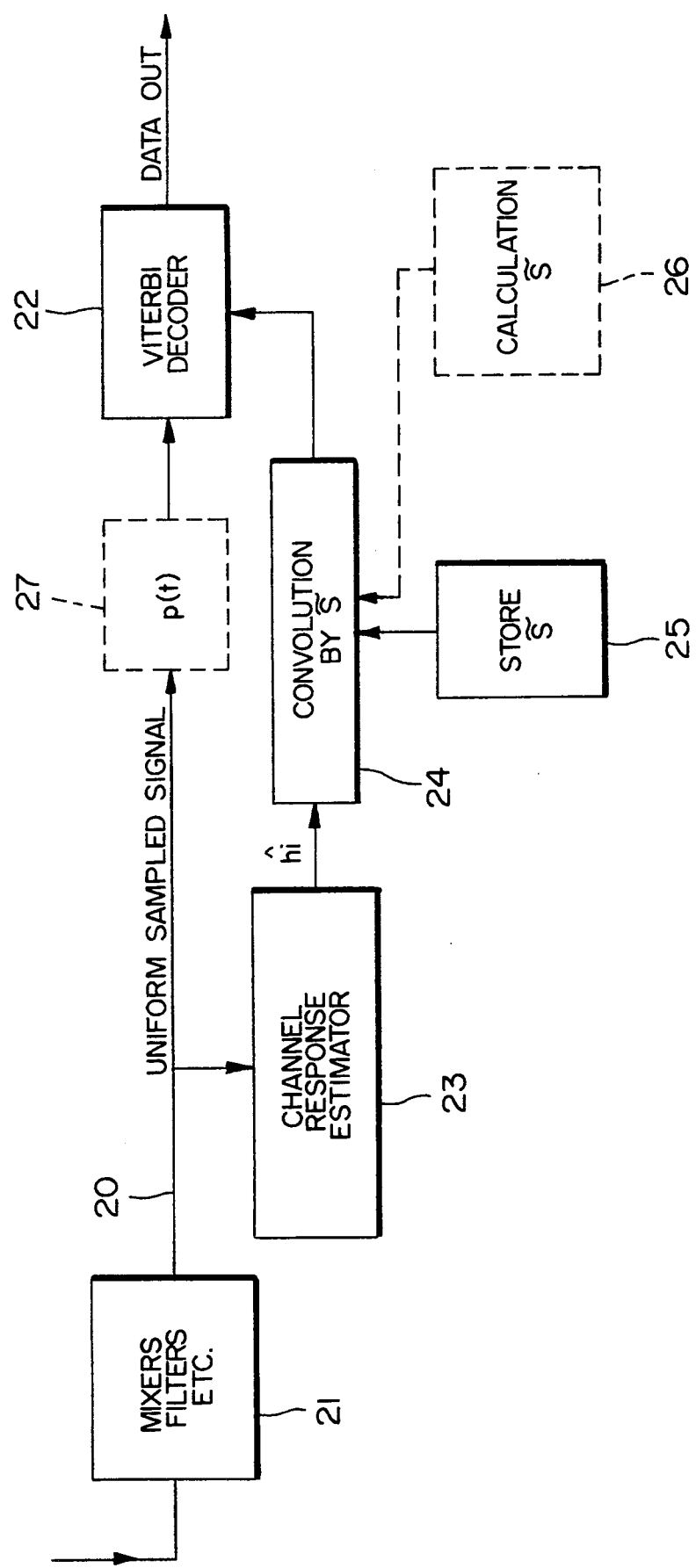
Figure 3:
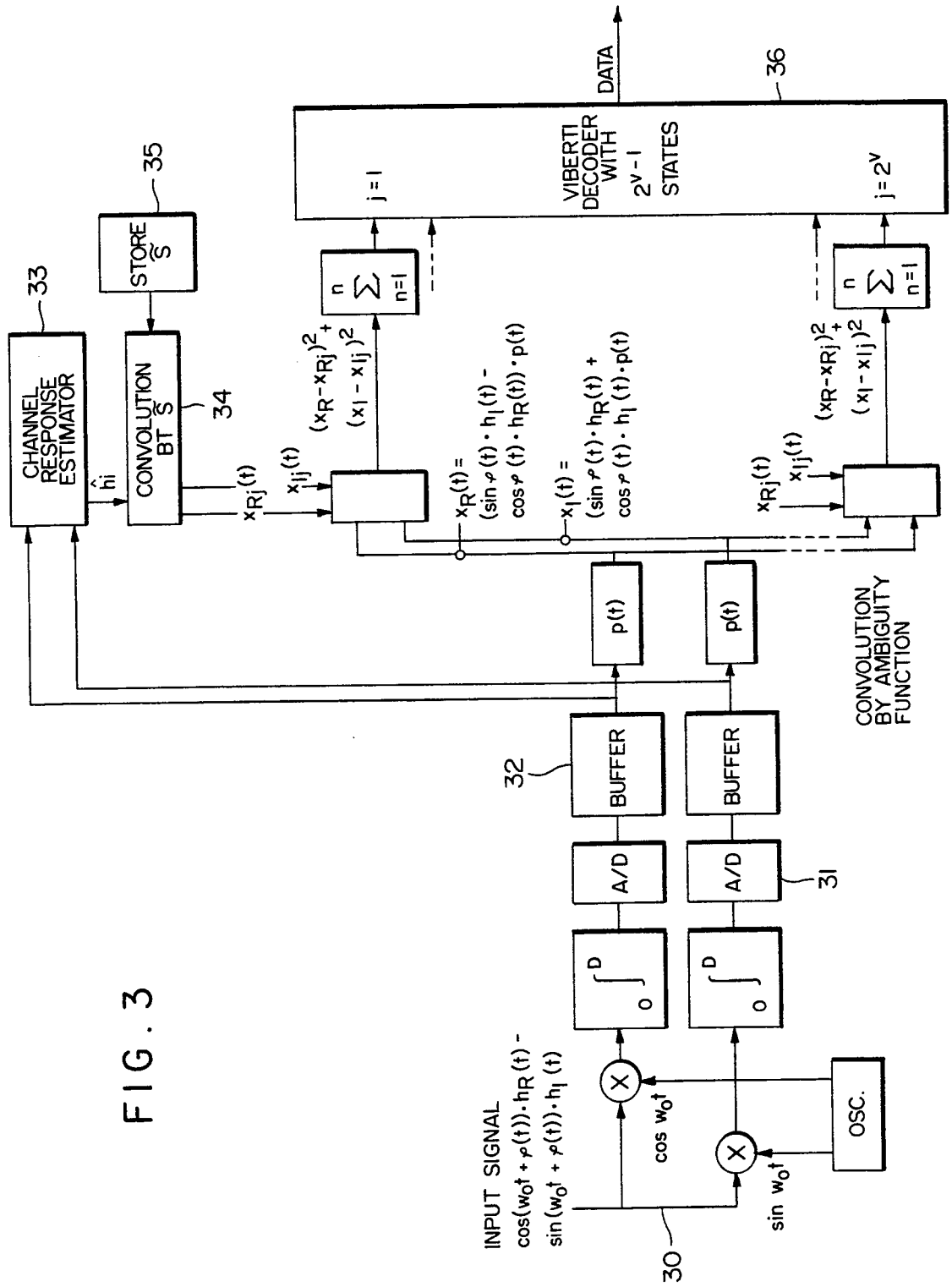

In the following description the invention shall be explained more closely with reference to the drawing, in which:

FIG. 1 is a block diagram showing in a simplified manner an example of a modulator (DPM) on the transmitter side of a digital communication system, FIG. 2 shows as an example a blokk diagram of a corresponding receiver suitable for carrying out the method according to the invention, and FIG. 3 shows somewhat more in detail the manner of operation in a receiver according to the principles of the block diagram in FIG. 2.

The modulator for DPM as shown in FIG. 1 has a design being commonly known to experts in the field and therefore does not require any detailed explanation.

Binary DPM signals {7} are produced by phase modulating a bipolar data stream $\alpha_i = \pm 1$ filtered through digital FIR-filter 10. Each delay element in the filter 10 has a duration D, whereas there are D delay elements per data symbol interval T, where is the oversampling rate.

The filter is excited by $\eta - 1$ consecutive 0's between each data symbol. The filter coefficients $\{b_i\} = 0$ for $i < 0$ and $i \geq K$, where K is the number of filter coefficients.

An example of a filter with 3RC-pulse, $\eta = 4$, i.e. K = 12:

$$b_i = \begin{bmatrix} \beta \sin^2\left(\pi \frac{i + 0.5}{K}\right) & \text{for } 0 \leq i < K \\ 0 & \text{otherwise} \end{bmatrix} \quad (1)$$

The constant $\beta$ is adjusted in order to obtain the desired modulation index.

In the form of a block diagram FIG. 2 shows an example of a receiver for adaptive DPM, intended for co-operation with a transmitter having a modulator as illustrated in FIG. 1. The receiver in the first place consists of a circuit 21 which converts the signal received into a sampled baseband representation 20. Other important units in FIG. 2 are a common Viterbi decoder 22, possibly a filter having an impulse response equal to the ambiguity function $\rho(t)$ 27, of the channel estimator, a channel response estimator 23 and a block 24 which represents convolution, as well as a store 25 for precalculated signal values $\overline{S}$. As an alternative to the store 25 there can be provided (shown with broken lines) a calculating unit 26 for calculating $\overline{S}$ as this becomes necessary with time. The blocks and units shown can be in the form of one or more VLSI-circuits which perform the signal processing as it will be understood by experts in the field.

It is not necessary to remove all received carrier frequency by converting to the baseband 20, since this can be compensated for by frequent updating of the channel response, whereby N points of the channel response $\hat{h}_i$ are calculated, $i = 0, 1, \ldots, N - 1$. N is chosen larger than $\nu\eta$, for example equal to $3\nu\eta$.

In advance there is calculated {2} a weight function $w_k$, which is used for picking a section of subsequent samples from $\hat{h}_i$ which maximises the performance of the Viterbi decoder.

With a number of states in the Viterbi decoder given as $2^{\nu-1}$ there is calculated $$w_k^2 = \quad (2)$$

$$\frac{1}{\eta} \sum_{p=0}^{\eta-1} \prod_{\substack{i = -\infty \\ (i \neq 1,2,\ldots,\nu)}}^{\infty} \cos^2 b_{i\eta - k - p + K/2 - 1}, \, k = a, a + 1, \ldots, b$$

and there is picked out a segment of $\hat{h}_i$ consisting of $(b - a)$ samples which maximises the sum $$\sum_{k=a}^{b} w_k^2 \, |\hat{h}_{i-k}|^2 \quad (3)$$

For a signal having a modulation index $\geq 1$ a suitable choice will be $a = 0$ and $b = \nu\eta$, whereas for smaller modulation indices or for frequency modulated signals (e.g. GMSK) a larger section of $\hat{h}_i$ may be utilised (i.e. $a < 0$ and $b > \nu\eta$).

Because the power spectrum of the transmitted signal has very small side lobes, the knowledge of the signal which is influenced by "unknown" data symbols does not disappear instantaneously. Therefore the receiver can take into account reflections caused by multipath transmission in which there are included signals being influenced by more data symbols than the $\nu$ known symbols. This can be done by averaging the transmitted signal over all data symbols being "unknown", whereas the "known" symbols are taken as given values. The result is the matrix $\overline{S}$ (which can be calculated in advance) which convolved with $\hat{h}_i$ is used as reference values for the calculation of metrics. The matrix $\overline{S}$ is defined by its elements (corresponds to (8) and (9) in claim 4).

$$\begin{aligned}\overline{S} &= \{S(t_k, a_{\nu-1+n} a_{\nu-2+n}, \ldots, a_n) \\ &= E\{S(t_k, a_k, a_{k-1}, \ldots a_{k-L+1}) | a_{\nu+n-1}, a_{\nu+n-2}, \ldots a_n\} \\ &= \{\overline{s}_{k,j}\}\end{aligned} \quad (4)$$

in which
the sampling index is $k = a - \eta + 1, a\eta + 2, \ldots, b$ and
the data symbol sequence index is $j = 1, 2, \ldots 2^\nu$.

FIG. 3 shows a receiver for DPM-signals being received through a channel having multipath transmission. The input signal 30 is converted to the baseband. Since transmission only takes place in short time-slots (TDMA), the signal is stored 32 after being digitised 31. The channel response hi is estimated 33 and convolved 34 with the matrix $\overline{S}$ which has been stored 35 and is ready for use in calculating the real $(X_{Rj})$ and the complex $(X_{Ij})$ reference value which is employed by the Viterbi decoder 36 for calculating metrics (branch metrics) at state transition number $j (j = 1, 2, \ldots 2^\nu)$.

Calculation of (4) results in $$\overline{s}_{k,j} = \exp\left[\sqrt{-1} \sum_{i=0}^{\nu-1} a_{i,j} b_{i\eta - k + K/2}\right] \prod_{\substack{i = -\infty \\ (i \neq 0, 1, \ldots, \nu - 1)}}^{\infty} \cos(b_{i\eta - k + K/2}) \quad (5)$$

Wherein $a_{i,j}$ is either $+1$ or $-1$ corresponding to bit No. i of data sequence No. j corresponding to state transition No. j in the trellis of the Viterbi decoder.

Reference values $X_j(t_i)$ for state transition $j (j = 1, 2, \ldots 2^\nu)$ at sampling instant No. i $(i = 0, 1, 2, \ldots (\eta - 1))$ can now be calculated by convolution with $\hat{h}_k$ which is the channel response convolved with the ambiguity function $\rho(t)$.

$$X_j(t_i) = \sum_{k=a}^{b} \hat{s}_{k-i,j} \cdot \hat{h}_k \qquad (6)$$

((6) corresponds to (10) in claim 4). These reference values can now be employed for calculating metrics (branch metrics) for each data transition in the Viterbi trellis.

$$m_j = \sum_{i=0}^{\eta-1} [(X_R(t_i) - X_{Rj}(t_i))^2 + (X_I(t_i) - X_{Ij}(t_i))^2] \qquad (7)$$

in which $$X_j(t_i) = X_{Rj}(t_i) + \sqrt{-1}\ X_{Ij}(t_i)$$

and $X(t) = X_R(t) + \sqrt{-1} XI(t)$ is the received signal as convolved with the ambiguity function of the channel estimator.

The Viterbi decoder in FIGS. 2 and 3 then has for its purpose to find that data symbol sequence which gives the smallest possible accumulated metrics by employing (7). The operation of a Viterbi decoder is described in chapter 6 of ref. {8}.

REFERENCES

{1} J. E. Stjernvall, K. Raith and B. Hedberg: "Performance of an Experimental FD/TDMA Digital Radio System", Paper No. 27, Second Nordic Seminar on Digital Land Mobile Radio Communication, Stockholm, Oct. 14–16, 1986.
{2} T. Maseng and O. Trandem: "Adaptive Digital Phase Modulation", Paper No. 19, Second Nordic Seminar on Digital Land Mobile Radio Communication, Stockholm, Oct. 14–16, 1986.
{3} T. Aulin: "A new Trellis Decoding Algorithm", Chalmers University of Technology, Division of Information Theory, Gøteborg, Techn. Report, No. 2, December 1985.
{4} A. Svensson, C. E. Sundberg and T. Aulin: "Distance measure for simplified receivers", Electronic Letters, Nov. 10, 1983, Vol. 19, No. 23, pp. 23–24.
{5} P. D. Falconer and F. R. Magee Jr.: "Adaptive Channel Memory Truncation for Maximum Likelihood Sequence Estimation", BSTJ, November 1973, pp. 15462.
{6} A. Svensson and C. E. Sundberg: "Performance of generalized AMF receivers for continuous phase modulation", IEE Proceedings, Vol. 132, Pt.F, No. 7, December 1985, pp. 541–547.
{7} T. Maseng: "Digitally Phase Modulated (DPM) Signals", IEEE Trans. on Com. September 1985, Vol. COM-33, No. 9, pp. 911–918.
{8} Clark and Cain: "Error-Correcting Coding for Digital Communications", Plenum Press, New York, 1981.
{9} J. L. Dornstetter: "The Digital Cellular SFH900 system", Paper No. 30, Second Nordic Seminar on Digital Land Mobile Radio Communication, Stockholm, Oct. 14–16, 1986.

We claim:

1. A method of demodulation in digital communication systems with multipath propagation, based on the use of algorithms with soft decision type decoding, where there is included calculation of reference values in the receiver, and the receiver in its selection of received sequences takes as a basis a calculation of metrics using the possible transmitted sequences and the signal received, and where the receiver only processes sequences having a limited number of consecutive data symbols which are denoted "known", $\nu$ and the instantaneous value of the received signal is influenced by a number of data symbols being larger than the number of data symbols being larger than the number of "known" symbols, other data symbols being denoted "unknown" data symbols, and the receiver employs an estimate of the impulse response, h(t), of the multipath propagation channel, characterized in that the calculation of the reference values for a certain sequence of "known" data symbols comprises the steps of:

obtaining a transmitted signal, S(t), for a sequence of data symbols having a length equal to the sum of the "known" and one or more "unknown" data symbols;

forming an average of said transmitted signal over all possible values of the "unknown" data symbols producing averaged signals $\bar{S}$;

convolving said averaged signals $\bar{S}$ with the estimates of the impulse response of the channel to calculate reference values for the received signal;

calculating a metric, by using said reference values, and the received signal at least for a limited number of possible sequences consisting of "known" data symbols; and estimating the actually transmitted sequence of data symbols using said metric.

2. Method according to claim 1, wherein the step of convolving includes the step of:

calculating reference values, x(t), at least with approximation, when the transmitted signal $\bar{S}$ at the instant t is influenced by L preceding data symbols wherein L is a number of symbols contained in memory of a transmitter, of duration T with values $\alpha_k, \alpha_{k-1}, \ldots \alpha_{k-L+1}$, according to the following expression:

$$x(t_n, a_{\nu-l+n}, a_{\nu+n-2}, \ldots a_n) = \Sigma \int_{(k-1)T}^{kT} E\{S(t, a_{k,a}\ k+1, \ldots a_{k-L+1}), | a_{\nu+n-1}, a_{\nu-2} \ldots a_n\} \cdot h(t_n - \tau)d\tau$$

whereby $a_n$ is equal to a data symbol, identified by a subscript;

n and K are variables used to identify data symbols;

$\tau$ denotes time; and

E {A|B} is used to simplify the mathematical expressions and definitions wherein A is equal to $S(T, \alpha_k, \alpha_{k-1}, \ldots \alpha_{k-L+1})$ and B is equal to $\alpha_{\nu+n-1}, \alpha_{\nu-z}, \ldots \alpha_n$ and is defined as the step of finding an average value of A over the unknown data symbols in A, whereas the ($\nu$) data symbols in B are known so that the exact values thereof shall be used when calculating A.

3. Method according to claim 1, wherein said convolving step includes the steps of obtaining all said averaged signals (S) being produced from the transmitted signal and the number of known data symbols in the receiver, and using said averaged signals (Š) for calculating reference values by convolution with the impulse response (ĥ(t)) of the channel.

4. Method according to claim 3, characterized in that obtaining said averaged signals Š is performed at least with approximation according to the following expression:

$$\check{S}(t, a_{\nu-1+n}, a_{\nu+n-2}, \ldots, a_n) = E\{\check{S}(t, a_k, a_{k-1}, \ldots a_{k-L+1}) | a_{\nu+n-1}, a_{\nu+n-2}, \ldots a_n\}$$

and $$t_a < t < t_b$$

wherein $a_n$ is equal to a data symbol identified by a subscript, n and k are variables used as subscripts to identify data symbols, t denotes time, a and b are variables and said averaged signals Š being employed for calculating reference values, x(t), substantially according to the following expression:

$$X(t_n, a_{\nu-1+n}, a_{\nu+n-2}, \ldots, a_n) =$$

$$\int_{t_a}^{t_b} \check{S}(\tau, a_{\nu-1+n}, a_{\nu+n-2}, \ldots, a_n) \cdot \hat{h}(t_n - \tau) d\tau.$$

$$x(t_n, a_{\nu-1+n}, a_{\nu+n-2}, \ldots a_n) = \Sigma \int_{(k-1)T}^{kT} E\{\check{S}(t, a_{k,a} k+1, \ldots a_{k-L+1}), | a_{\nu+n-1}, a_{\nu-2}, \ldots a_n\} \cdot h(t_n - \tau) d\tau$$

wherein $\tau$ denotes time.

5. Method according to claim 3, further comprising the steps of precalculating and storing said averaged signals Š in the receiver so that they can be used for calculating reference values by convolution with the impulse response ĥ(t) of the channel.

6. Method according to claim 2, including the step of storing, based on a generated channel response being given in advance, the calculated reference values in the receiver.

7. Method according to claim 1, further including the steps of employing coherent demodulation and storing the calculated reference values in the receiver based on a generated channel response being given in advance except for its complex phase.

8. An apparatus for demodulation in digital communication systems with multipath propagation, based on the use of algorithms with decoding of the soft decision type, where there is included calculation of reference values in the receiver, and the receiver in its selection of received sequences takes as a basis a calculation of metrics using the possible transmitted sequences and the signal received, and where the receiver on account of the complexity or current consumption only processes sequences having each a limited number of consecutive data symbols which in the following are denoted "known", $\nu$, and the instantaneous value of the received signal is influenced by a number of data symbols being larger than this number of "known" symbols, $\nu$, these other data symbols being in the following denoted "unknown" data symbols, and the receiver employs an estimate of the impulse response ĥ(t) of the multipath propagation channel, characterized in that the calculation of the reference values for a certain sequence of "known" data symbols comprises:

means for obtaining a transmitted signal, S(t), for a sequence having a length equal to the sum of the "known" and one or more "unknown" data symbols;

means for forming an average of said transmitted signal over all possible values of the "unknown" data symbols producing averaged signals Š;

means for convolving said averaged signals Š with the estimates of the impulse response of the channel to calculate reference values for the instantaneous value of the received signal;

means for calculating a metric by using said reference valves and the received signal at least for a limited number of possible sequences consisting of "known" data symbols; and means for using said metrics in estimating the transmitted sequence of data symbols.

9. The apparatus according to claim 8, wherein said convolving means includes:

means for calculating reference values, x(t), with approximation, when the transmitted signal S at the instant of time t is influenced by L preceding data symbols, wherein L is a number of data symbols contained in memory of a transmitter, of duration T with data symbol values $a_k, a_{k-1}, \ldots a_{k-L+1}$, according to the following expression:

whereby $a$ is equal to a data symbol identified by a subscript n and k are variables used as subscripts to identify data symbols $\tau$ denotes time and E {A|B} is a simplified expression for use in the above mathematical equation and is performed by means for finding an average value of A over the unknown data symbols in A, whereas the data symbols $\nu$ in B are known so that the exact values thereof shall be used when calculating A.

10. The apparatus according to claim 8, wherein said convolving means includes means for obtaining all said averaged signals Š from the transmitted signal and the number of known data symbols in the receiver, and means for obtaining reference values by convolving said averaged signals Š with the impulse response h(t) of the channel.

11. The apparatus according to claim 10, wherein said means for obtaining said averaged signals S includes means for operating with approximation according to the following expression:

$$\check{S}(t, a_{\nu-1+n}, a_{\nu+n-2}, \ldots, a_n) = E\{\check{S}(t, a_k, a_{k-1}, \ldots a_{k-L+1}) | a_{\nu+n-1}, \ldots a_n\}$$

and $$t_a < t < t_b$$

wherein $a_n$ is equal to a data symbol identified by a subscript, n and k are variables used as subscripts to identify data symbols, t denotes time, and a and b are variables and said averaged signals (Š) being employed for calculating reference values, x(t), substantially according to the following expression:

$$X(t_n, a_{\nu-1+n}, a_{\nu+n-2}, \ldots, a_n) =$$

-continued $$\int_{t_a}^{t_b} \tilde{S}(\tau, a_{v-1+n}, a_{v+n-2}, \ldots, a_n) \cdot \hat{h}(t_n - \tau) d\tau$$

wherein T denotes time.

12. The apparatus according to claim 10, also including means for storing precalculated averaged signals $\tilde{S}$ in the receiver so that they can be used for calculating reference values by convolution with the impulse response h(t) of the channel.

13. The apparatus according to claim 8, based on a channel response generated in the apparatus being given in advance, also including means for storing said calculated reference values in the receiver.

14. The apparatus according to claim 8, based on a channel response generated in the apparatus being given in advance for its complex phase, including means for performing coherent demodulation and means for storing said reference values calculated in the receiver.

15. Method according to claim 1, further comprising the step of convolving the impulse response $\hat{h}(t)$ of the multipath propagation channel employed as an estimate by the receiver with an ambiguity function $\rho(t)$ of the channel estimated.

* * * * *